(12) United States Patent  
Shannon

(10) Patent No.: US 7,347,440 B2
(45) Date of Patent: Mar. 25, 2008

(54) TRAILER HITCH HAVING MULTIPLE HITCH BALLS

(76) Inventor: Glenn Russell Shannon, 345 Longstreet Rd., St. Matthews, SC (US) 29135

( * ) Notice: Subject to any disclaimer, the term of this patent is extended or adjusted under 35 U.S.C. 154(b) by 121 days.

(21) Appl. No.: 11/167,030

(22) Filed: Jun. 25, 2005

(65) Prior Publication Data

US 2006/0290098 A1 Dec. 28, 2006

(51) Int. Cl.
*B62D 53/06* (2006.01)

(52) U.S. Cl. .................. 280/416.1; 280/415.1

(58) Field of Classification Search ........... 280/416.1, 280/416.2, 416.3, 491.1, 511, 415.1
See application file for complete search history.

(56) References Cited

U.S. PATENT DOCUMENTS

| | | | |
|---|---|---|---|
| 2,911,233 A | 11/1959 | Riddle | 280/415 |
| 3,801,134 A | 4/1974 | Dees | 280/415 A |
| 4,248,450 A | 2/1981 | McWethy | 280/415 A |
| 4,456,279 A | 6/1984 | Dirck | 280/415 A |
| 4,729,571 A | 3/1988 | Tienstra | 280/415 A |
| 5,044,652 A | 9/1991 | Brisson | 280/416.1 |
| 5,106,114 A | 4/1992 | Haupt | 296/68.1 |
| 5,158,316 A | 10/1992 | Hutchmacher | 280/415.1 |
| D331,558 S | 12/1992 | Hayes, Jr. | D12/162 |
| 5,265,899 A | 11/1993 | Harrison | 280/416.1 |
| 5,322,313 A | 6/1994 | Schroeder | 280/416.1 |
| 5,351,982 A * | 10/1994 | Walrath | 280/416.1 |
| D356,764 S | 3/1995 | Thixton, Jr. et al. | D12/162 |
| 5,560,630 A | 10/1996 | Phares et al. | 280/416.1 |
| D379,608 S | 6/1997 | Rodriquez | D12/162 |
| 5,725,229 A | 3/1998 | McWethy | 280/416.1 |
| 5,839,744 A | 11/1998 | Marks | 280/416.4 |
| 5,857,693 A * | 1/1999 | Clark, Jr. | 280/415.1 |
| 5,890,727 A | 4/1999 | May | 280/416.1 |
| 5,915,714 A | 6/1999 | Bell et al. | 280/456.1 |
| D415,725 S | 10/1999 | Wyant | D12/162 |
| 6,315,316 B1 | 11/2001 | Wyant | 280/511 |
| 6,497,428 B2 | 12/2002 | Ross | 280/415.1 |
| 6,926,261 B1 * | 8/2005 | Renshaw | 254/420 |
| 2002/0024194 A1 | 2/2002 | Ross | 280/416.1 |

OTHER PUBLICATIONS

Carr Lane Manufacturing Co. catalog "Ball Lock Pins" p. 8.

* cited by examiner

*Primary Examiner*—Tony Winner

(57) ABSTRACT

A trailer hitch is provided having multiple hitch balls extending from a rotatable plate, which allows a hitch ball of the desired diameter to be selected, locked in place and coupled to a trailer. The rotating plate and multiple hitch balls are part of the ball mount component of the trailer hitch and are supported by a shaft, extending outward from the portion of the trailer hitch attached to a vehicle.

21 Claims, 2 Drawing Sheets

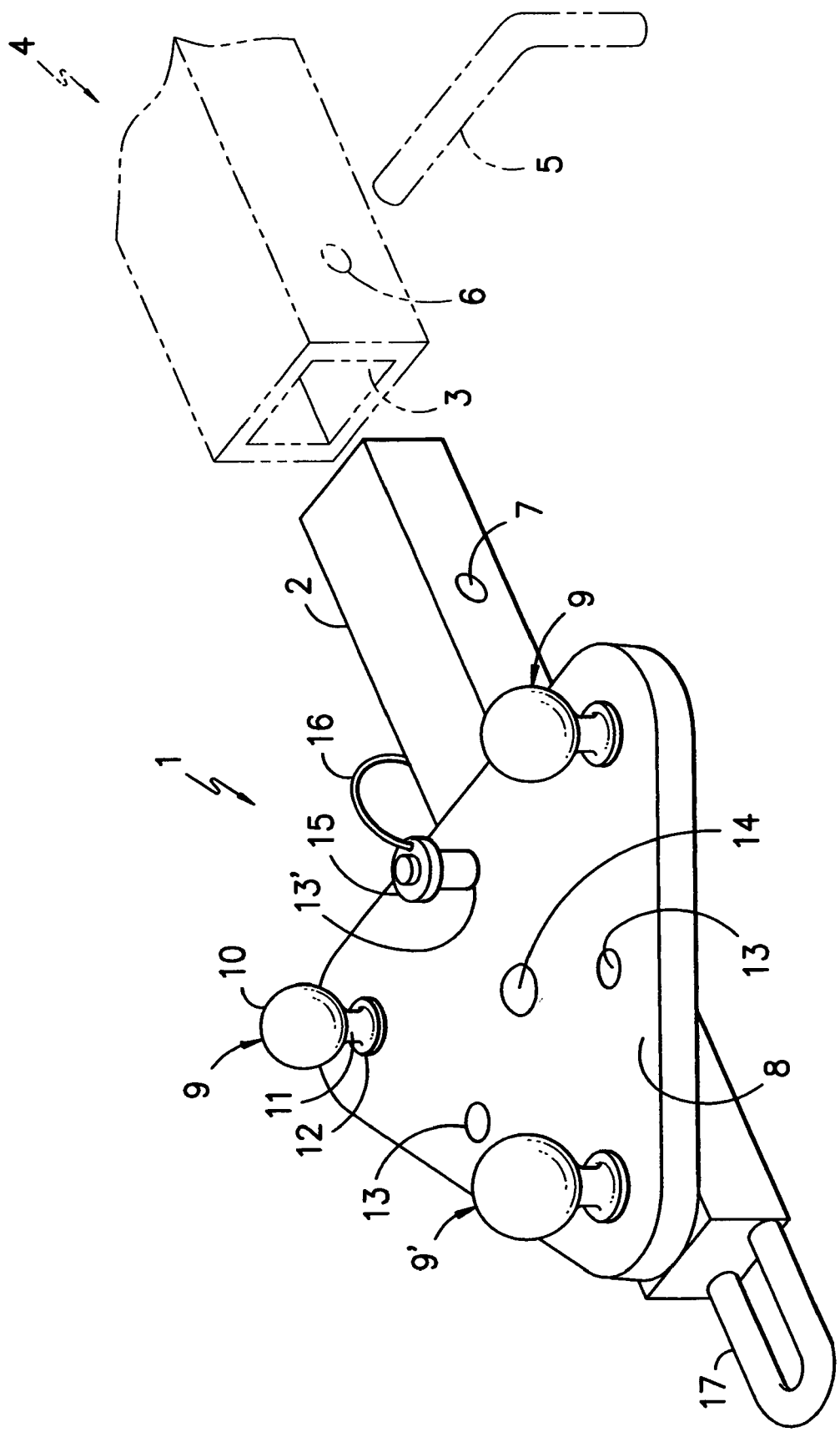
Figure −1−

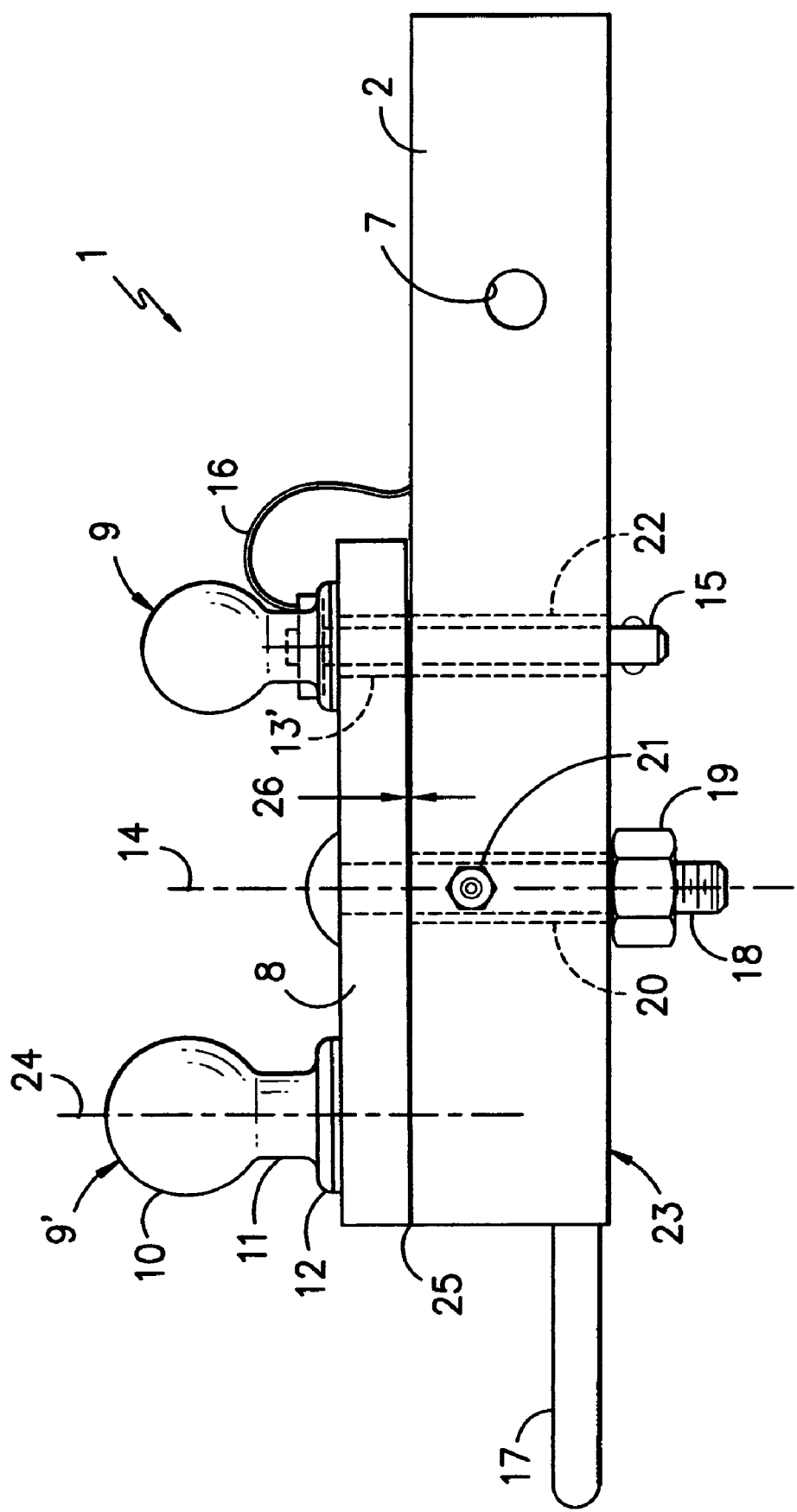
Figure -2-

TRAILER HITCH HAVING MULTIPLE HITCH BALLS

BACKGROUND OF THE INVENTION

This invention relates to the ball mount component of a trailer hitch having multiple hitch balls mounted on a rotating plate, and a trailer hitch incorporating such a ball mount component.

A trailer may be connected to a vehicle via a trailer hitch. The trailer hitch is attached to a vehicle and typically includes a hitch ball positioned at an appropriate height off the ground to engage the tongue of the trailer. A coupler at the end of the trailer tongue fits over the hitch ball and locks into place, allowing the vehicle and trailer to pivot in relation to each other, for example, when making turns, but prevents separation. The "ball mount" is the component of the trailer hitch that includes the hitch ball(s) and the supporting structure for the hitch ball(s).

In the United States, trailer hitches are rated according to weight capacity, in particular gross towing weight (the gross weight of the trailer and its load) and tongue weight (the downward force of the trailer tongue on the hitch ball). Class I hitches are for towing up to 2,000 lbs. gross trailer weight and up to 200 lbs. tongue weight. Class II hitches are for towing up to 3,500 lbs. gross trailer weight and up to 350 lbs. tongue weight. Class III hitches are for towing up to 6,000 lbs. gross trailer weight and up to 600 lbs. tongue weight. Class IV hitches are for towing up to 12,000 lbs. gross trailer weight and up to 1,200 lbs. tongue weight. Class V hitches are for towing gross trailer weights greater than 12,000 lbs. and tongue weights greater than 1,200 lbs.

The coupler on the trailer tongue and the hitch ball are available in different sizes, and it is necessary to match the size of the coupler and the hitch ball, to ensure proper operation during towing. For example, in the United States, common hitch ball sizes range from 1⅞" to 3", measured as the diameter of the hitch ball. Accordingly, when switching from one trailer to the next, it is often necessary for the driver of the vehicle to switch the hitch ball, to accommodate the size of the trailer's coupler.

One method of facilitating the switch from one size hitch ball to another has been to provide a ball hitch assembly having multiple hitch balls. In U.S. Pat. No. 6,315,316 B1, Wyant discloses a turntable having multiple hitch balls bolted to it. In particular, the hitch balls are mounted on the turntable by a threaded stud, extending downward from the hitch ball and through the turntable, and held in place with a nut. A spacing member is interposed between the turntable and the supporting shaft of the ball mount, to provide sufficient clearance to allow the turntable to rotate. The spacing member creates a "moment arm" between the turntable and the supporting shaft, however, which is undesirable and can limit the weight that can be towed by the trailer hitch.

A trailer hitch having selectable, multiple hitch balls is disclosed in Ross, U.S. Pat. No. 6,497,428 B2. The multiple hitch balls are mounted on a revolving plate, which is supported by a "base plate" welded to the support shaft. A locking pin may be inserted through holes in the revolving plate and base plate, to hold a hitch ball in a desired position. The use of a base plate in the ball mount mechanism has a number of drawbacks, which include added weight, introduction of extra assembly steps to weld the base plate to the support shaft, and creation of the opportunity for moisture trapped between the revolving plate and the base plate to rust the assembly. Further, as the thickness of the base plate increases, a moment arm is created between the revolving plate and the shaft.

Despite earlier efforts, there remains a need for an improved trailer hitch, having multiple hitch balls, which meets one or more of the following objectives. The trailer hitch should have a minimum of parts and be relatively easy to assemble. It should be relatively inexpensive to manufacture. The trailer hitch should be designed to maximize the mechanical advantage of the load bearing components, thereby maximizing its weight handling (towing) capabilities. It should be easy to service and maintain. The trailer hitch should be easy to operate, that is, easy to change from one hitch ball to another and easy to connect to a trailer. Further, the ball mount component of the trailer hitch should be interchangeable with and/or compatible with the receiver hitch component of standard trailer hitches.

SUMMARY OF THE INVENTION

A trailer hitch may be characterized as having two components: a receiver hitch component, which is the primary device attached to a vehicle, and a ball mount component, which connects to the receiver hitch. The ball mount component has a plurality of hitch balls, which are attached to a rotating plate, and a shaft supporting the plate, so that the hitch balls are accessible to a trailer to be towed.

In general terms, the shaft of the ball mount connects to the receiver hitch so that the ball mount will be securely held in place, when a trailer is coupled to a hitch ball and is being towed by a vehicle. In standard trailer hitches, the ball mount has a shaft, which is designed to slide into an opening in the receiver hitch, corresponding to complimentary male and female elements, respectively. The shape of the ball mount shaft and the receiver hitch opening may conveniently be rectangular, typically square, so the shaft will not rotate and will be held in a fixed orientation. The shaft may be secured in the receiver hitch by a pin, which passes through holes lined up in the shaft and receiver hitch. Accordingly, the ball mount of the present invention is interchangeable with and can be substituted for prior art ball mounts, in a standard trailer hitch assembly. Alternatively, the shaft may be attached to the receiver hitch by a permanent or semi-permanent connection, such as by one or more welds, bolts, screws, pins or by other method known to those skilled in the art.

A plurality of hitch balls are attached to and extending outward from an upper surface of the plate. The hitch balls are characterized by a spherical ball, a shank and a base, with the base typically being flared at the bottom to maximize stability. At least two hitch balls are present. The upper limit of the number of hitch balls that may be attached to the plate is bounded by the practical limitations of (a) size, i.e. there must be enough spacing between hitch balls to allow towing operations—to allow the trailer coupler to fit over the hitch ball and to allow the tongue of the trailer to pivot when the vehicle turns; and (b) necessity, for example, most towing needs may be met by four sizes of hitch ball: 1⅞", 2", 2 5/16" and 3". A balance of versatility and practicality is typically met by employing three or four hitch balls.

The hitch balls are attached to the plate so as to remain securely in place when the hitch ball is coupled to a trailer. There is no particular limitation on the means used to attach the hitch ball to the plate, except that rotation of the plate, relative to the shaft, should not be restricted. Restriction of rotation of the plate may be avoided by ensuring that the means used to attach the hitch ball to the upper surface of the plate does not protrude beyond the lower surface of the plate. By way of example, the hitch balls may be welded to the plate, the hitch balls may have threaded studs that can be screwed into the plate, or a combination of the foregoing techniques may be employed.

The plate is characterized by an axis of rotation aligned perpendicular to the width of the plate. Generally, the axis of rotation is located in the center of the plate, but may be placed off-center. The plate may be circular, triangular or rectangular, or the plate may be irregularly or asymmetrically shaped. The size and shape of the plate are selected to accommodate the number of hitch balls, with sufficient space to allow for towing operations. The hitch balls are spaced outward from the axis of rotation.

The plate is connected to the end of the shaft that is opposite from the end of the shaft connected to the receiver hitch, the former being referred to herein as the "distal end". The plate is aligned parallel to the side of the shaft, with the lower surface of the plate facing the side of the shaft. It may be understood that the shaft of the ball mount may be straight, curved to "stepped", for example, the distal end of the shaft and the end connected to the receiver hitch may be joined by a vertical riser or a curved section, designed to position the hitch balls at a desired height to meet a trailer. The plate and distal end of the shaft are aligned substantially parallel to the ground, in a horizontal plane.

The plate is connected to the shaft by an axle, which is aligned perpendicular to the shaft and through the axis of rotation of the plate. A first end of the axle is fastened to the distal end of the shaft, and a second end of the axle extends upward and is fastened to the end of the plate, whereby the plate is allowed to rotate relative to the shaft. Various methods may be used to fasten the axle to the shaft. For example, a hole may be drilled though the shaft, from one side to another, and the first end of the axle fastened in place by a nut secured to threads cut in the first end of the axle. In another embodiment, a hole may be drilled partially through the shaft, and the first end of the axle may be fastened in place by threads tapped in the hole or by welding. Similarly, various methods may be used to fasten the second end of the axle to the plate. For example, the second end of the axle may be welded to the plate, provided that the axle is free to rotate. In another alternative, the axle extends through a hole in the plate and is held in place by a nut secured to threads cut in the second end. Regardless of the precise means selected to fasten the first and second ends of the axle to the shaft and plate, respectively, the plate is free to rotate about the axle, relative to the shaft, preferably a full 360°.

In embodiments of the invention where the axle rotates relative to the shaft, a grease fitting may be installed in a side of the shaft and in communication with the hole in the shaft through which the axle is inserted, to provide lubrication.

During the operation of the trailer hitch, a hitch ball selected for coupling to a trailer will be rotated into a position facing away from the towing vehicle and in the direction of the distal end of the shaft, i.e. away from the end of the shaft engaging the receiver hitch. The tongue weight of a trailer is transferred downward from the hitch ball to the plate, which in turn is supported by the shaft. In one embodiment of the invention, the lower surface of the plate will be in contact with and will be supported by the side of the shaft, even without a load on the hitch ball. It may be understood, that when the plate is rotated, for example, when a new hitch ball is selected, at least a portion of the lower surface of the plate will be in sliding contact with the side of the shaft. In another embodiment, the lower surface of the plate comes in contact with and is supported by the side of the shaft when a load is placed on the hitch ball. For example, the tolerance between the plate, axle and shaft, is sufficiently great to allow the plate to rest against the side of the shaft, when the plate is forced downward by the tongue weight of a trailer, such as while towing a trailer with a tongue weight of 350 lbs. or more.

The position of the axle, relative to the end of the shaft may be advantageously selected to provide increased support for the force of the trailer tongue weight on the plate. For example, in one embodiment of the invention, the distal end of the shaft extends beyond the axis of rotation of the plate, to a distance below the plate at least as far as an imaginary vertical centerline drawn through the hitch ball positioned to be coupled to a trailer. Greater support for the plate may be achieved by a design in which the distal end of the shaft extends to a distance below the plate at least as far as the entire base of the hitch ball selected to be coupled to a trailer.

An advantage of the present invention is that it is unnecessary to provide a stationary "base", welded to the shaft and extending outward beneath the rotating plate, to support the rotating plate, as shown in the prior art.

It may be possible to insert a gasket or washer, such as a Teflon washer, between the lower surface of the plate, for example, to decrease friction or to prevent moisture from entering the space between the axle and the shaft. In order to avoid creating a significant "moment arm", the space between the lower surface of the plate and the side of the shaft is preferably ¼" or less, preferably ⅛" or less, most preferably 3⁄32 or less.

Once a desired hitch ball is selected, the plate is locked in place, to prevent further rotation of the plate, relative to the shaft. Accordingly, a locking mechanism, which engages the plate and the shaft, and prevents their relative movement, is employed. By way of example, the locking mechanism may be a pin, such as a ball lock pin, which is inserted in a hole through the width of the plate and extends into a corresponding hole drilled partially or all the way through the side of the shaft, both holes being equidistant from the axle. The hole in the plate is in line with the selected hitching ball and the axis of rotation of the plate, so that the hole in the plate will overlay the hole in the shaft. In one embodiment of the invention, a hole corresponding to each hitch ball is drilled through the plate, on the opposite side of the axis of rotation of the plate i.e. 180° from the corresponding hitch ball. In the foregoing instance, the hole in the shaft comprising the locking mechanism is positioned between the axle and the end of the shaft connected to the receiver hitch. For example, when a plate with three hitch balls is employed, the hitch balls may be spaced 120° apart, and three holes may be spaced 120° apart, wherein the holes are positioned 60° relative to the hitch balls. The holes in the plate are spaced outward from the axis of rotation of the plate, but need not be the same distance from the axis of rotation of the plate as the hitch balls.

In another embodiment, the locking mechanism may be a bar, such as a square bar, mounted in a recess in the shaft and biased inward to engage corresponding notches positioned around the edge of the plate.

The ball mount can be constructed out of any material able to handle the stress introduced by a vehicle towing a trailer. Ordinarily the ball mount will be constructed out of metal. By way of example, the plate and shaft can be constructed out of steel, for example a low silica steel, and the hitch balls can be constructed out of steel, for example cold drawn or cold drawn annealed steel. The axle and locking mechanism are can be constructed out of steel. The parts of the ball mount, can be painted for aesthetics and to inhibit corrosion, except that the hitch balls are typically not painted.

The ball mount of the present invention is suitable for use as a component of a Class I, Class II, Class III and/or Class IV trailer hitch.

All of the United States patents cited in this application are hereby incorporated by reference.

BRIEF DESCRIPTION OF THE DRAWINGS

FIG. 1 is a perspective of the ball mount having three hitch balls and receiver hitch (dashed lines).

FIG. 2 is a side view of the ball mount having three hitch balls.

DETAILED DESCRIPTION OF THE INVENTION

An embodiment of the invention having three hitch balls attached to a triangular shaped plate is shown in FIG. 1. The plate has three flat sides and adjacent sides form approximately 60° angles. The hitch balls are spaced at the apexes of the triangle, although the corners may be rounded or truncated for convenience and safety, as shown in the drawing. The triangular shape of the plate is particularly advantageous with regard to utilization of raw materials, such as a sheet of steel from which plates are cut. For example, comparing a circular plate and a triangular plate, each having three hitch balls spaced the same distance from the axis of rotation and from each other, the yield of plates from a 4' by 8' sheet of steel is 35% greater with triangular plates relative to circular plates.

Ball mount 1 has a shaft 2, which is inserted in opening 3 in receiver hitch 4. Shaft 2 is held securely in place by receiver pin 5, which is inserted through hole 6 in receiver hitch 4 and hole 7 in shaft 2, once the holes are aligned. The shaft may be made from a solid material or it may be hollow. Typical shaft sizes are 2" by 2" square cross-section, but can be varied depending upon the weight bearing requirements.

Plate 8 is mounted on the end of shaft 2. Hitch balls 9 are attached to the upper side of plate 8. Each of hitch balls 9 are characterized by a sphere 10, shank 11 and base 12. In FIG. 1, hitch balls 9 are attached to plate 8 at base 12 by welding. Each of the three hitch balls have a different diameter, to fit a variety of trailers.

The thickness of plate 8 is selected to provide the desired strength and resistance to the stresses introduced in towing a trailer. By way of example, the thickness of plate 8 may range from ¼" to ⅝", and will typically be ⅜" to ½" thick.

Holes 13 have been drilled through the width of plate 8. Three holes are provided corresponding to each of the three hitch balls. Hitch balls 9 and holes 13 are spaced outward from the axis of rotation 14 of plate 8. Hitch balls 9 are arranged 120° apart. Holes 13 are also arranged 120° apart from each other, and staggered approximately 60° relative to hitch balls 9. By way of example, the three hitch balls may be 1⅞", 2" and 2 5/16" in diameter.

Ball pin 15 is inserted through hole 13' in plate 8 and through hole 16 in shaft 2 (shown in FIG. 2), thereby preventing rotation of plate 8 relative to shaft 2, with hitch ball 9' presented for coupling to a trailer. Hitch ball 9', hole 13' and axis of rotation 14 are in line, which allows ball pin 15 to engage both plate 8 and shaft 2, with hitch ball 9' facing away from the rear of a vehicle. Cable 16 is attached at one end to ball pin 15 and the other end to shaft 2, and prevents ball pin 15 from becoming separated from ball mount 1.

Handle 17 is welded to the end of shaft 2 (distal end), for carrying ball mount 1.

FIG. 2 is a side view of the embodiment of the invention shown in FIG. 1. Plate 8 is connected to shaft 2 by axle 18. The lower end of axle 18 is threaded and engaged by nut 19, which acts to fasten the lower end of the axle 18 to shaft 2. Nut 19 may be prevented from unscrewing by welding nut 19 and axle 18 together, or other method known to those skilled in the art, such as a cotter pin (not shown). The upper end of axle 18 is fastened to plate 8 by welding, which allows axle 18 to rotate in hole 20 of shaft 2. A grease fitting 21 is tapped into the side of shaft 2, for lubricating axle 18.

Although not shown in FIG. 2, it may be understood that axle 18 may be fixed relative to shaft 2, for example by welding, and plate 8 may be allowed to rotate relative to axle 18.

FIG. 2 shows ball pin 15 inserted through hole 22 in shaft 2, which is aligned perpendicular to plate 8 and parallel to the axis of rotation 14.

The end of shaft 2 beneath plate 8 is identified as distal end 23 (distal relative to the end inserted into receiver hitch 4). Distal end 23 extends beyond an imaginary centerline 24 drawn through sphere 10 of hitch ball 9', and even extends beyond base 12 of hitch ball 9', when hitch ball 9' is rotated to a position in line with shaft 2 and in the direction of distal end 23, that is, away from receiver hitch 4.

Plate 8 and the side of shaft 2 are in contact at interface 25 below hitch ball 9'. Thus, the downward force on hitch ball 9' and plate 8, caused by the tongue weight of a trailer, is counteracted by shaft 2. It may also be understood that the close proximity of plate 8 to the side of shaft 2, as measured at axle 18, and shown as space 26 in FIG. 2, minimizes the moment arm formed by the plate and axle, relative to the shaft, which is generated by horizontal forces, especially inertia, arising from the gross weight of the trailer during towing.

The invention may be further understood by reference to the following claims.

What I claim is:

1. A ball mount component of a trailer hitch comprising:
   (a) a shaft having an end shaped to fit into a receiver component of a trailer hitch, a distal end and a side;
   (b) a plate aligned parallel to the side of the shaft and having (i) an axis of rotation perpendicular to a width of the plate; (ii) an upper surface; and (iii) a lower surface facing the side of the shaft;
   (c) a plurality of hitch balls attached to the plate and extending outward from the upper surface of the plate;
   (d) an axle aligned perpendicular to the distal end of the shaft, wherein (i) a first end of the axle is fastened to the distal end of the shaft, whereby the distal end of the shaft extends beyond the axis of rotation of the plate, to a distance below the plate at least as far as an imaginary vertical centerline drawn through a hitch ball positioned to be coupled to a trailer and (ii) a second end of the axle extends outward from the side of the shaft and is fastened to the plate along its axis of rotation, wherein the lower surface of the plate below the hitch ball positioned to be coupled to a trailer is in contact with and supported by the side of the shaft and the plate is free to rotate 360° relative to the shaft; and
   (e) a locking mechanism capable of engaging the plate and the shaft, and preventing rotation of the plate, relative to the shaft.

2. The ball mount of claim 1, wherein the distal end of the shaft extends beyond the axis of rotation of the plate, to a distance below the plate at least as far as an entire base of the hitch ball positioned to be coupled to a trailer.

3. The ball mount of claim 1, wherein the locking mechanism comprises a pin inserted through a hole spaced outward from the axis of rotation of the plate and extending through the width of the plate, and a hole in the distal end of the shaft.

4. The ball mount of claim 1, wherein the plate is triangular shaped and has three hitch balls positioned in the apexes of the triangular shape.

5. The ball mount of claim 4, wherein the locking mechanism comprises a pin, inserted through a hole extending through the width of the plate, spaced outward from the axis of rotation the plate, and a hole in the distal end of the shaft, wherein the hole in the plate is located in line with the hitch ball positioned to be coupled to a trailer and the axis of rotation of the plate, and is positioned 180° from the hitch ball.

6. A ball mount component of a trailer hitch comprising:
(a) a shaft having an end shaped to fit into a receiver component of a trailer hitch, a distal end, wherein an upper side of the distal end has a first hole for receiving an axle and a second hole for receiving a locking pin;
(b) a plate aligned parallel to the side of the shaft and having (i) an axis of rotation perpendicular to a width of the plate; (ii) an upper surface; (iii) a lower surface facing the side of the shaft; and (iv) a plurality of holes extending though the width of the plate and spaced outward from the axis of rotation;
(c) a plurality of hitch balls attached to the plate and extending outward from the upper surface of the plate;
(d) means to attach the hitch balls to the plate, wherein the hitch ball attaching means do not protrude beyond the lower surface of the plate;
(e) an axle aligned perpendicular to the distal end of the shaft, wherein (i) a first end of the axle is positioned in the first hole in the shaft and fastened to the distal end of the shaft and (ii) a second end of the axle extends outward from the side of the shaft and is fastened to the plate along its axis of rotation, allowing the plate to rotate relative to the shaft; and
(f) a locking pin positioned through one of the holes in the plate and the second hole in the distal end of the shaft, thereby preventing rotation of the plate, relative to the shaft.

7. The ball mount of claim 6, wherein the lower surface of the plate is in sliding contact with the side of the shaft, when the plate is rotated.

8. The ball mount of claim 7, wherein the plate is triangular shaped and has three hitch balls positioned in the apexes of the triangular shape.

9. The ball mount of claim 6, wherein the tolerance between the plate, the axle and the shaft, is sufficiently great to allow the plate to rest against the side of the shaft, when the plate is forced downward by a trailer having a tongue weight of 350 lbs. or more, coupled to a hitch ball.

10. The ball mount of claim 9, wherein the distal end of the shaft extends beyond the axis of rotation of the plate, to a distance below the plate at least as far as an imaginary vertical centerline drawn through a hitch ball positioned to be coupled to a trailer.

11. The ball mount of claim 10, wherein the plate is triangular shaped and has three hitch balls positioned in the apexes of the triangular shape, and the plate may be rotated 360°.

12. The ball mount of claim 9, wherein the distal end of the shaft extends beyond the axis of rotation of the plate, to a distance below the plate at least as far as the entire base of a hitch ball positioned to be coupled to a trailer.

13. Trailer hitch comprising a receiver hitch component, attachable to a vehicle and a ball mount component connected to the receiver hitch, wherein the ball mount component further comprises:
(a) a shaft having an end connected to the receiver hitch component, a distal end and a side;
(b) a plate aligned parallel to the side of the shaft and having (i) an axis of rotation perpendicular to a width of the plate; (ii) an upper surface; and (iii) a lower surface facing the side of the shaft;
(c) a plurality of hitch balls attached to the plate and extending outward from the upper surface of the plate;
(d) an axle aligned perpendicular to the distal end of the shaft, wherein (i) a first end of the axle is fastened to the distal end of the shaft, and positioned in a hole and (ii) a second end of the axle extends outward from the side of the shaft and is fastened to the plate along its axis of rotation, allowing the plate to rotate 360° relative to the shaft, wherein the distance between the lower surface of the plate and the side of the shaft is ¼" or less; and
(e) a locking mechanism capable of engaging the plate and the shaft, and preventing rotation of the plate, relative to the shaft.

14. The trailer hitch of claim 13, wherein the tolerance between the plate, the axle and the shaft of the ball mount component is sufficiently great to allow the plate to rest against the side of the shaft, when the plate is forced downward by a trailer having a tongue weight of 350 lbs. or more, coupled to a hitch ball.

15. The trailer hitch of claim 14, wherein the distal end of the shaft extends beyond the axis of rotation of the plate, to a distance below the plate at least as far as an imaginary vertical centerline drawn through a hitch ball positioned to be coupled to a trailer.

16. The trailer hitch of claim 14, wherein the distal end of the shaft extends beyond the axis of rotation of the plate, to a distance below the plate at least as far as the entire base of a hitch ball positioned to be coupled to a trailer.

17. The trailer hitch of claim 13, wherein the locking mechanism comprises a pin, inserted through a hole spaced outward from the axis of rotation the plate and extending through the width of the plate, and a hole in the distal end of the shaft, wherein the hole in the plate is located in line with a hitch ball positioned to be coupled to a trailer and the axis of rotation of the plate, and the hole is positioned 180° from the hitch ball.

18. The trailer hitch of claim 13, wherein the distance between the lower surface of the plate and the side of the shaft is 3/32" or less, the plate is triangular shaped and has three hitch balls positioned in the apexes of the triangular shape.

19. A ball mount component of a trailer hitch comprising:
(a) a shaft having an end shaped to fit into a receiver component of a trailer hitch, a distal end and a side;
(b) a plate having a thickness of ¼ inch to ⅝ inch aligned parallel to the side of the shaft and having (i) an axis of rotation perpendicular to a width of the plate; (ii) an upper surface; and (iii) a lower surface facing the side of the shaft;
(c) a plurality of hitch balls attached to the plate and extending outward from the upper surface of the plate;
(d) an axle aligned perpendicular to the distal end of the shaft, wherein (i) a first end of the axle is fastened to the distal end of the shaft and (ii) a second end of the axle extends outward from the side of the shaft and is fastened to the plate along its axis of rotation, wherein the lower surface of the plate is in contact with and supported by the side of the shaft and the plate is free to rotate 360° relative to the shaft; and (e) a locking mechanism capable of engaging the plate and the shaft, and preventing rotation of the plate, relative to the shaft.

20. The ball mount of claim 19, wherein the distal end of the shaft extends beyond the axis of rotation of the plate, to a distance below the plate at least as far as an entire base of a hitch ball positioned to be coupled to a trailer.

21. The ball mount of claim 20, wherein the plate is triangular shaped and has three hitch balls positioned in the apexes of the triangular shape, and the plate may be rotated 360°.

* * * * *